United States Patent
Holl et al.

(10) Patent No.: US 7,221,062 B2
(45) Date of Patent: May 22, 2007

(54) HYBRID DRIVE SYSTEM AND METHOD FOR ADJUSTING A HYBRID DRIVE SYSTEM

(75) Inventors: Eugen Holl, Langenzenn (DE); Swen Ruppert, Möhrendorf (DE)

(73) Assignee: Siemens Aktiengesellschaft, Munich (DE)

( * ) Notice: Subject to any disclaimer, the term of this patent is extended or adjusted under 35 U.S.C. 154(b) by 276 days.

(21) Appl. No.: 10/485,522

(22) PCT Filed: Jul. 17, 2002

(86) PCT No.: PCT/DE02/02608

§ 371 (c)(1),
(2), (4) Date: Feb. 2, 2004

(87) PCT Pub. No.: WO03/016088

PCT Pub. Date: Feb. 27, 2003

(65) Prior Publication Data

US 2005/0000741 A1   Jan. 6, 2005

(30) Foreign Application Priority Data

Aug. 2, 2001   (DE) ............................... 101 37 908

(51) Int. Cl.
*B60L 3/00* (2006.01)
*H02M 7/5387* (2006.01)
(52) U.S. Cl. .................. 307/10.1; 363/132
(58) Field of Classification Search .......... 363/132, 363/139, 40, 49, 98; 320/104; 307/10.1
See application file for complete search history.

(56) References Cited

U.S. PATENT DOCUMENTS

| | | | | |
|---|---|---|---|---|
| 5,099,410 A | * | 3/1992 | Divan | 363/98 |
| 5,272,616 A | * | 12/1993 | Divan et al. | 363/49 |
| 5,402,046 A | * | 3/1995 | Jeanneret | 318/139 |
| 5,465,203 A | * | 11/1995 | Bhattacharya et al. | 363/40 |
| 5,710,699 A | | 1/1998 | King et al. | 363/132 |
| 5,778,997 A | * | 7/1998 | Setaka et al. | 180/65.2 |
| 5,847,520 A | | 12/1998 | Theurillat et al. | 318/139 |
| 5,852,558 A | * | 12/1998 | Julian et al. | 363/132 |
| 5,905,360 A | | 5/1999 | Ukita | 320/118 |
| 6,118,676 A | * | 9/2000 | Divan et al. | 363/34 |
| 6,331,365 B1 | * | 12/2001 | King | 429/9 |
| 6,333,568 B1 | * | 12/2001 | Bitsche et al. | 307/10.1 |
| 6,424,115 B1 | * | 7/2002 | Holl et al. | 320/104 |

FOREIGN PATENT DOCUMENTS

| | | |
|---|---|---|
| DE | 4416679 | 12/1994 |
| DE | 195 12 512 A1 | 11/1995 |
| DE | 198 28 512 A1 | 12/1999 |

* cited by examiner

*Primary Examiner*—Pia Tibbits
(74) *Attorney, Agent, or Firm*—Harness, Dickey & Pierce

(57) ABSTRACT

A hybrid drive system is for a vehicle and includes an intermediate circuit and an energy accumulator. The energy accumulator is connected to the intermediate circuit by way of a diode, whereby a transistor enabling current to flow in an opposite direction is connected parallel thereto. The transistor is placed in a blocking position in order to discharge the energy accumulator and the diode enables current to pass. If the energy accumulator is not used, the diode is also blocked by increasing the voltage of the intermediate circuit with the aid of the voltage on the energy accumulator. In order to charge the energy accumulator, the transistor is conductingly switched. The diode does not allow the current to pass in this direction.

8 Claims, 2 Drawing Sheets

HYBRID DRIVE SYSTEM AND METHOD FOR ADJUSTING A HYBRID DRIVE SYSTEM

This application is the national phase under 35 U.S.C. § 371 of PCT International Application No. PCT/DE02/02608 which has an International filing date of Jul. 17, 2002, which designated the United States of America and which claims priority on German Patent Application number DE 101 37 908.0 filed Aug. 2, 2001, the entire contents of which are hereby incorporated herein by reference.

FIELD OF THE INVENTION

The invention generally relates to a hybrid drive system for a vehicle with an intermediate circuit and an energy accumulator.

The invention also generally relates to a method for controlling such a hybrid drive system.

BACKGROUND OF THE INVENTION

A known hybrid drive system is used both for road vehicles, for example passenger cars and buses, and for rail vehicles. It is distinguished by the fact that an internal combustion engine with a generator, for example a diesel engine with a generator, and an electric motor are present. The internal combustion engine is connected to the electric motor via the generator and an intermediate circuit. The intermediate circuit is assigned a battery or a capacitor as the energy accumulator. In comparison with a battery, a capacitor has a higher power density, a longer service life and is also maintenance-free. To be able to store an adequate amount of energy, special capacitors, known as ultracapacitors, are used.

In the case of the vehicle, a distinction is made between stationary mode, starting mode, driving mode and braking mode. In stationary mode and during starting, energy is taken from the energy accumulator. In the case of urban buses, starting advantageously takes place exclusively electrically, in order that the energy stored in the energy accumulator is efficiently used and no exhaust gases are emitted, for example at a bus stop. During driving mode, the energy accumulator is neither discharged further nor charged. Only during braking mode is the kinetic energy of the vehicle to be stored in the energy accumulator.

Owing to a relatively low energy density, in the case of a capacitor the voltage drops relatively quickly when discharging occurs. If the capacitor is operated directly on the intermediate circuit of the drive system, the voltage of the intermediate circuit, which is then also low, has a disadvantageous effect on the performance of the drive system, i.e. the drive components must be operated with low voltage.

It is known to counteract this disadvantage of low voltage by generating a high current flow, which is possible only by way of overdimensioned components. It is also already known to connect the capacitor to the intermediate circuit via a converter, for example via a step-up/step-down converter. However, this converter includes complex and expensive electronics and also causes an appreciable additional weight.

Both the overdimensioning of the components and the converter lead to a greater weight and higher costs.

SUMMARY OF THE INVENTION

An embodiment of the invention is based on an object of providing a hybrid drive system and a method for controlling the hybrid drive system which require neither overdimensioning of components nor additional, expensive electronic components.

An object of providing a suitable hybrid drive system may be achieved according to an embodiment of the invention by the energy accumulator being connected to the intermediate circuit via a switch including a diode which has a forward direction toward the intermediate circuit and a transistor which can be turned on and off, is arranged parallel to the diode and has a forward direction toward the energy accumulator.

This may achieve an advantage that, when it is not required during driving mode, the energy accumulator can be disconnected by a simple device, for example by a diode and a transistor, from the remaining drive system. As such, the low voltage of the energy accumulator in the state of partial discharge cannot have any disadvantageous effect on the drive. This also achieves the advantage that, since parallel connections comprising a diode and transistor are present in any case in the power converter to which the intermediate circuit belongs, no special circuits have to be set up.

The energy accumulator is, for example, an ultracapacitor, which has a low weight with a high storage capacity.

An object of providing a suitable method for controlling the hybrid drive is achieved according to an embodiment of the invention by the transistor being turned off and the diode forward-biased for discharging the energy accumulator, by the transistor being turned off and the diode also blocked for disconnecting the energy accumulator, when it is neither to be charged nor discharged, and/or by the transistor being turned on and the diode reverse-biased for charging the energy accumulator.

The discharging consequently only takes place via the diode. As soon as energy is no longer required from the energy accumulator, the diode is also blocked, so that the low voltage across the partially discharged capacitor or the voltage of the battery cannot disturb the drive system. If, then, in braking mode, the energy accumulator is to be charged, the transistor is turned on. Charging of the energy accumulator via the diode is not possible, since it is reverse-biased toward the energy accumulator.

The method achieves the advantage that a current flow from the energy accumulator to the drive system for discharging and a current flow in the reverse direction for charging the energy accumulator is made possible by simple devices, or otherwise the energy accumulator is disconnected from the drive system. A low voltage across the energy accumulator therefore cannot have any disadvantageous effect on the drive system. It therefore does not have to be overdimensioned. Furthermore, no complex electronics are necessary.

During discharging, the diode is forward-biased, since the voltage across the intermediate circuit is less than the voltage across the energy accumulator by the amount of the diode voltage. When the energy accumulator has been discharged to a minimum level and its voltage has dropped, the diode is blocked and the transistor turned off in a specifically set way.

For blocking the diode, for example the voltage across the intermediate circuit is specifically increased until it is greater than the voltage across the energy accumulator and, in addition, the drive system is thereby supplied with adequate voltage. For this purpose, an already present voltage regulator is used in power converters operating on the intermediate circuit.

For charging the energy accumulator, for example the voltage across the intermediate circuit is brought in a specifically controlled manner to the level of the voltage across the energy accumulator before the transistor is turned on. This can achieve an advantage that, a short-circuit current, or at least an excessive equalizing current, cannot occur when the transistor is turned on.

When the voltage across the intermediate circuit is increased, it can be set for example to an optimum operating point in order to operate the electrical machines that are operated by way of the power converters connected to the intermediate circuit with an optimum magnetic flux.

BRIEF DESCRIPTION OF THE DRAWINGS

Further advantages, features and details of the invention will become evident from the description of illustrated embodiments given hereinbelow and the accompanying drawing, which is given by way of illustration only and thus is not limitative of the present invention.

An exemplary embodiment of a hybrid drive system and a method for controlling such a hybrid drive system according to an embodiment of the invention is explained in more detail on the basis of the drawings, wherein.

DETAILED DESCRIPTION OF THE PREFERRED EMBODIMENTS

Figure 1:
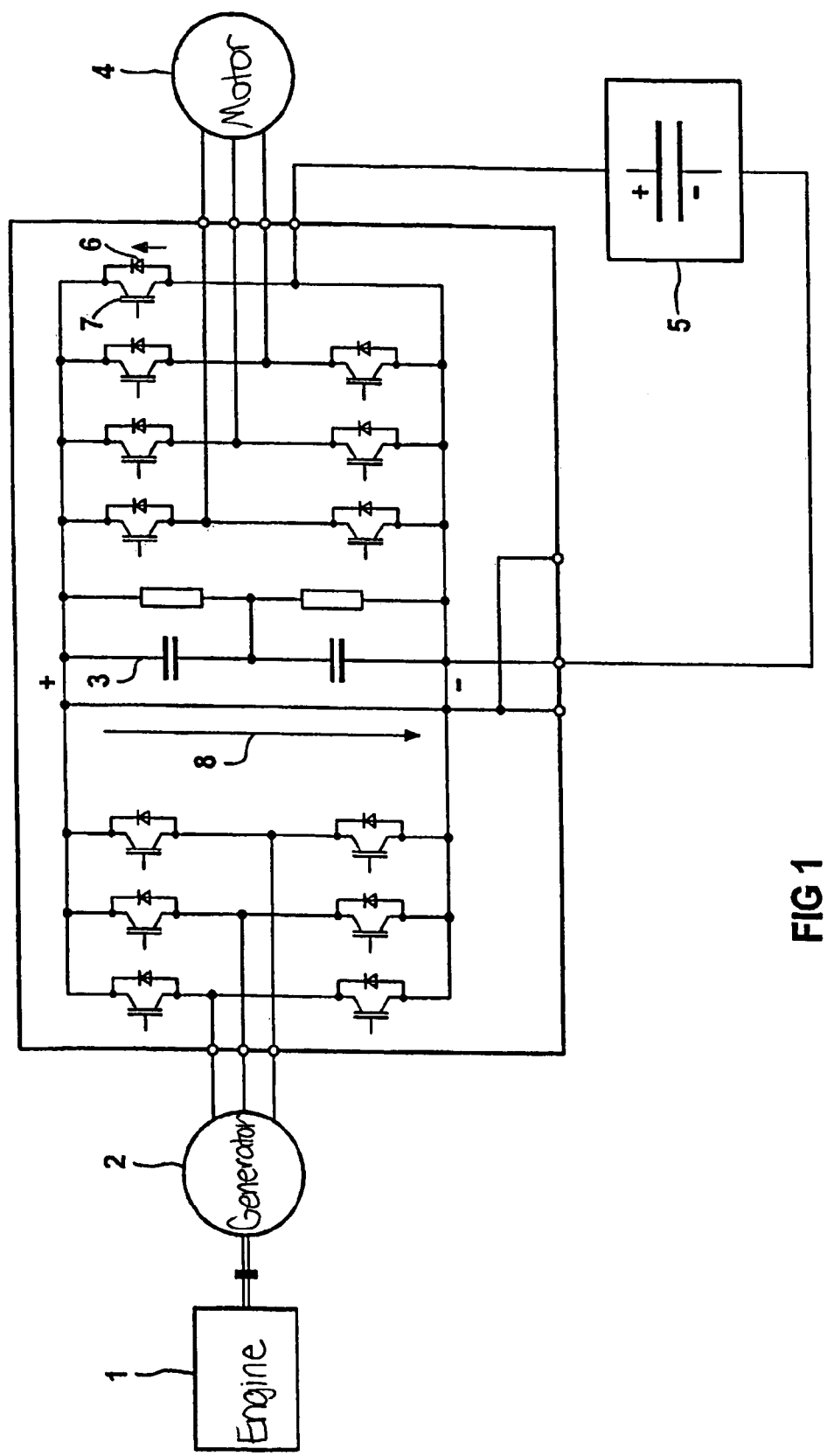
FIG. 1 shows the hybrid drive system.

The hybrid drive system according to FIG. 1 includes an internal combustion engine 1, a generator 2, an intermediate circuit 3 and an electric motor 4, which are connected one behind the other. Provided as the energy accumulator 5 is an ultracapacitor, which is connected to the intermediate circuit 3 via a switch. The switch includes a diode 6 which has a forward direction toward the intermediate circuit 3 and a transistor 7 which can be turned on and off, is arranged parallel to the diode 6 and has a forward direction toward the energy accumulator 5. For controlling the voltage 8 across the intermediate circuit 3, there is a voltage regulator (not shown).

The transistor 7 is turned off during discharging of the energy accumulator 5 and also whenever the energy accumulator 5 is to be disconnected from the drive system. During discharging, a current then flows from the energy accumulator 5 to the intermediate circuit 3, and consequently to the electric motor 4, since the voltage across the energy accumulator 5 is greater than the voltage 8 across the intermediate circuit 3.

In order that the low voltage across the energy accumulator 5 after partial discharge does not have any adverse effect on the drive system, the diode 6 is blocked during the usual driving mode 9 (FIG. 2), in that the voltage 8 across the intermediate circuit 3 is increased by way of the voltage regulator until it is exactly equal to or greater than the voltage across the energy accumulator 5, and operation of the connected electrical machines, generator 2 and electric motor 4, with adequate voltage is ensured. The voltage across the energy accumulator 5 can then no longer have any effect on the voltage across other components of the system.

When the vehicle is braked, the kinetic energy of the vehicle then present is to be stored in the energy accumulator 5 after conversion in the generator 2. Since the diode 6 is always reverse-biased from the intermediate circuit 3 to the energy accumulator 5, the transistor 7 is turned on. Before this, however, the setpoint value for the control of the voltage 8 across the intermediate circuit 3 is reduced, so that it is brought to the level of the voltage at that moment across the energy accumulator 5. During the subsequent turning on of the transistor 7, an excessive equalizing current, or even a short-circuit current, consequently cannot occur.

Figure 2:
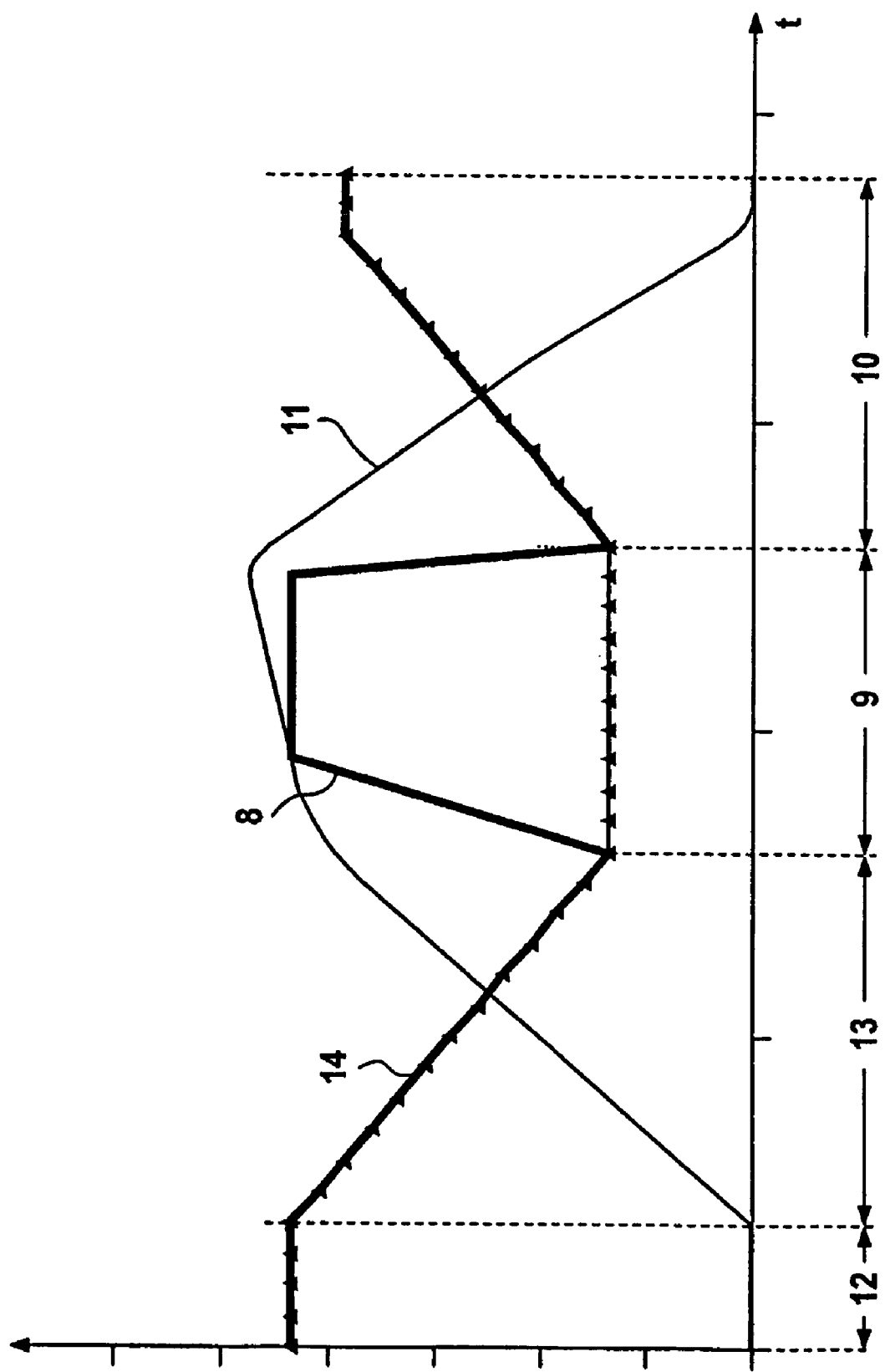
FIG. 2 shows the variations of the vehicle speed, the voltage across the intermediate circuit and the voltage across the capacitor for stationary mode, starting mode, driving mode and braking mode.

The charging of the energy accumulator 5 can be initiated whenever the vehicle driver changes from driving mode 9 to braking mode 10 (FIG. 2).

FIG. 2 schematically shows the variation of the speed 11 of the vehicle starting from stationary mode 12 during accelerating mode 13, driving mode 9 and braking mode 10. The voltage 14 across the energy accumulator 5, which is likewise shown, decreases, since said energy accumulator is discharged during accelerating mode 13. During driving mode 9, it remains at the low level. During braking mode 10, it increases, since the energy accumulator 5 is charged.

In order for the diode 6 to block, at the end of accelerating mode 13 the voltage 8 across the intermediate circuit 3, which is also shown (FIG. 1) and previously corresponded to the voltage 14 across the energy accumulator 5, is increased with the aid of the voltage regulator to such an extent that it is greater than the voltage 14 across the energy accumulator 5. In particular, the voltage 8 across the intermediate circuit 3 (FIG. 1) is increased up to an optimum operating point.

At the beginning of braking mode 10, the previously turned-off transistor 7 must be turned on, in order for a current flow to be possible from the intermediate circuit 3 to the energy accumulator 5. In order that this does not cause a great equalizing current, before the transistor 7 is turned on the voltage 8 across the intermediate circuit 3 (FIG. 1) is brought to the level of the voltage 14 across the energy accumulator 5. Only immediately after this is the transistor 7 turned on, so that the energy accumulator 5 is charged and, as a result, the voltage 14 across the energy accumulator 5 increases.

This achieves in particular the advantage that the low voltage 14 across the energy accumulator 5 during driving mode 9 cannot affect the drive system even though there are no complex, heavy electronics and the system does not have to be overdimensioned.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for controlling a hybrid drive system with an intermediate circuit and an energy accumulator, the energy accumulator being connected to the intermediate circuit via a switching device, the switching device including a diode with a forward direction toward the intermediate circuit and a transistor, adapted to be turned on and off, arranged parallel to the diode and including a forward direction toward the energy accumulator, wherein the transistor is turned off and the diode is forward-biased for discharging the energy accumulator and the transistor is turned on and the diode is reverse-biased for charging the energy accumulator, that the method comprising:

turning the transistor off and blocking the diode to disconnect the energy accumulator when it is neither to be charged nor discharged; and bringing the voltage across the intermediate circuit to a level of the voltage across the energy accumulator and then turning the transistor on to charge the energy accumulator.

2. A method for controlling a hybrid drive system with an intermediate circuit and an energy accumulator, the energy accumulator being connected to the intermediate circuit via a switching device, the switching device including a diode with a forward direction toward the intermediate circuit and a transistor, adapted to be turned on and off, arranged parallel to the diode and including a forward direction toward the energy accumulator, wherein the transistor is turned off and the diode is forward-biased for discharging the energy accumulator and the transistor is turned on and the diode is reverse-biased for charging the energy accumulator, the method comprising:

turning off the transistor; and increasing the voltage across the intermediate circuit until the voltage is greater than the voltage across the energy accumulator, to thereby disconnect the energy accumulator when it is neither to be charged nor discharged, wherein, to charge the energy accumulator, the voltage across the intermediate circuit is brought to the level of the voltage across the energy accumulator and then the transistor is turned on.

3. The method as claimed in claim 1, wherein controlling of the voltage across the intermediate circuit, to bring it to the level of the voltage across the energy accumulator, occurs at the same time as a change from a driving mode to a braking mode.

4. The method as claimed in claim 2, wherein controlling of the voltage across the intermediate circuit, to bring it to the level of the voltage across the energy accumulator, occurs at the same time as a change from a driving mode to a braking mode.

5. The method as claimed in claim 1, wherein the energy accumulator is an ultracapacitor.

6. The method as claimed in claim 2, wherein the energy accumulator is an ultracapacitor.

7. The method as claimed in claim 3, wherein the energy accumulator is an ultracapacitor.

8. The method as claimed in claim 4, wherein the energy accumulator is an ultracapacitor.

* * * * *